US009124710B2

United States Patent
Park et al.

(10) Patent No.: US 9,124,710 B2
(45) Date of Patent: *Sep. 1, 2015

(54) APPARATUS AND METHOD FOR CONTROLLING BUILT-IN MICROPHONE OF PORTABLE TERMINAL

(71) Applicant: Samsung Electronics Co., Ltd., Gyeonggi-do (KR)

(72) Inventors: Sang-Kyu Park, Gyeonggi-do (KR); Seung-Yup Lee, Gyeonggi-do (KR); Jung-Ho Park, Seoul (KR); Soo-Ho Song, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,848

(22) Filed: Jul. 8, 2014

(65) Prior Publication Data

US 2014/0323114 A1    Oct. 30, 2014

Related U.S. Application Data

(63) Continuation of application No. 12/113,577, filed on May 1, 2008, now Pat. No. 8,774,863.

(30) Foreign Application Priority Data

May 4, 2007    (KR) .................. 2007-43405

(51) Int. Cl.
*H04M 3/00* (2006.01)
*H04M 1/60* (2006.01)
(Continued)

(52) U.S. Cl.
CPC .......... *H04M 1/6058* (2013.01); *H04M 1/6016* (2013.01); *H04M 1/6066* (2013.01); *H04M 1/725* (2013.01); *H04W 4/008* (2013.01)

(58) Field of Classification Search
CPC ................... H04R 2201/103; H04R 2201/107; H04M 1/6066; H04M 2250/02; H04M 1/6016; H04M 1/6058; H04M 1/725; H04W 4/008
USPC ......................................................... 455/418
See application file for complete search history.

(56) References Cited

U.S. PATENT DOCUMENTS 4,790,002 A    12/1988 D'Agosto, III et al.
6,594,366 B1 *    7/2003 Adams ............................. 381/74
(Continued)

FOREIGN PATENT DOCUMENTS

EP    1199867    10/2000
EP    1 670 283    6/2006
(Continued)

OTHER PUBLICATIONS

Motorola Manual Entitled "Motorola Rokr E2," Exhibited in CES Trade Show, Jan. 2006.
(Continued)

*Primary Examiner* — Timothy Pham
(74) *Attorney, Agent, or Firm* — The Farrell Law Firm, P.C.

(57) ABSTRACT

An apparatus and method for controlling a built-in microphone of a portable terminal is provided. The method includes checking whether a connection device connected to the portable electronic device includes an external microphone; operating the built-in microphone of the portable electronic device to receive a first signal, upon connecting a call, when the connection device does not include the external microphone; and selecting, upon connecting the call while a plurality of connection devices are connected to the portable electronic device, one connection device from among the plurality of connection devices to output a second signal.

35 Claims, 2 Drawing Sheets

(51) Int. Cl.
  *H04M 1/725* (2006.01)
  *H04W 4/00* (2009.01)
  *H04B 1/38* (2015.01)
  *H04M 1/00* (2006.01)
  *H01R 3/00* (2006.01)

(56) References Cited

U.S. PATENT DOCUMENTS

| | | | |
|---|---|---|---|
| 2002/0037746 | A1 | 3/2002 | Osano |
| 2003/0115059 | A1* | 6/2003 | Jayaratne ................. 704/235 |
| 2003/0151678 | A1* | 8/2003 | Lee et al. ................ 348/231.4 |
| 2004/0209647 | A1* | 10/2004 | Jeong et al. ............... 455/557 |
| 2004/0266349 | A1* | 12/2004 | Wang ....................... 455/41.2 |
| 2005/0090141 | A1 | 4/2005 | Peng et al. |
| 2005/0130593 | A1 | 6/2005 | Michalak |
| 2006/0062400 | A1 | 3/2006 | Chia-Chun |
| 2006/0251277 | A1 | 11/2006 | Cho |
| 2007/0037615 | A1* | 2/2007 | Glezerman ............... 455/575.2 |
| 2007/0082717 | A1 | 4/2007 | Lee et al. |
| 2008/0146292 | A1 | 6/2008 | Gilmore et al. |
| 2008/0159561 | A1 | 7/2008 | Parker et al. |
| 2008/0164994 | A1 | 7/2008 | Johnson et al. |
| 2008/0200159 | A1* | 8/2008 | Lai .............................. 455/416 |
| 2008/0261524 | A1* | 10/2008 | Grushkevich ............... 455/41.2 |

FOREIGN PATENT DOCUMENTS

| | | |
|---|---|---|
| EP | 1 684 492 | 7/2006 |
| JP | 2005109845 | 9/2003 |
| JP | 2005-109845 | 4/2005 |
| JP | 2005109845 | 4/2005 |
| KR | 102005010983 | 11/2005 |
| KR | 1020050109830 | 11/2005 |
| KR | 102007001783 | 2/2007 |
| KR | 1020070017834 | 2/2007 |

OTHER PUBLICATIONS

U.S. Office Action dated Dec. 3, 2014 issued in counterpart U.S. Appl. No. 14/507,217.
European Search Report dated May 19, 2015 issued in counterpart application No. 08155054.3-1972.

* cited by examiner

APPARATUS AND METHOD FOR CONTROLLING BUILT-IN MICROPHONE OF PORTABLE TERMINAL

PRIORITY

This application is a Continuation Application of U.S. application Ser. No. 12/113,577, which was filed in the U.S. Patent & Trademark Office on May 1, 2008 and claims priority under 35 U.S.C. §119(a) to a Korean patent application filed in the Korean Intellectual Property Office on May 4, 2007 and assigned Serial No. 2007-43405, the entire contents of each of which are incorporated herein by reference.

BACKGROUND OF THE INVENTION

1. Field of the Invention

The present invention relates to an apparatus and method for controlling a built-in microphone of a portable terminal. More particularly, the present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone.

2. Description of the Related Art

Recently, with the rapid development of portable terminals, a mobile phone providing wireless voice call and data exchange is regarded as a necessity of life. Conventional portable terminals have generally been regarded as portable devices providing wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions such as watching a satellite broadcasting program, games, Web surfing using the wireless Internet, watching video, listening to music, e-mail services, and so on.

In particular, a headset may be used to receive services in a public place by using a portable terminal capable of playing back video and music. When launched, the portable terminal generally includes a headset so that a user can receive music and audio services through a speaker included in the headset. In addition, when a call is made by call connection, a call service can be provided by receiving user's voice through a microphone included in the headset.

However, as high-quality sound can be provided with the continued development of the portable terminal, users are generally no longer satisfied with the quality of sound provided through the headset included in the portable terminal. Thus, such a user must additionally purchase a device for outputting high-quality sound according to personal preference.

In general, the output device purchased by the user is an earphone without a microphone. In this case, when a call connection event occurs for call reception/origination in a state that the earphone without the microphone is connected to the conventional portable terminal, in order to make a call, the earphone connected to the portable terminal has to be disconnected. In addition, the user inconveniently has to take off the earphone from his or her ear. That is, to achieve the high-quality sound, the user has to experience inconvenience during a call connection.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling a built-in microphone of a portable terminal.

Another aspect of the present invention is to provide an apparatus and method for controlling a built-in microphone of a portable terminal, in which a connection device is checked upon detecting a call connection event and whether to use the built-in microphone is determined according to the connection device.

Another aspect of the present invention is to provide an apparatus and method in which a built-in microphone of a portable terminal is controlled such that, when a call connection event occurs for call reception/origination in the portable terminal connected with an earphone without a microphone, an output audio voice signal is output to the connected earphone and an input audio signal is received through the built-in microphone.

According to an aspect of the present invention, a portable electronic device is provided. The portable electronic device includes a built-in microphone; a connector; a connection device checker configured to check whether a connection device connected to the connector includes an external microphone, wherein the connector is electrically coupled to the connection device checker; and a controller electrically coupled to the connection device checker, the controller being configured to operate the built-in microphone to receive a first signal, upon connecting a call, when the connection device does not include the external microphone, and being further configured to select, upon connecting the call while a plurality of connection devices are connected to the portable electronic device, one connection device from among the plurality of connection devices to output a second signal.

According to another aspect of the present invention, a portable electronic device is provided. The portable electronic device includes means for checking whether a connection device connected to the portable electronic device includes an external microphone; and means for, upon connecting a call, operating a built-in microphone of the portable electronic device to receive a first signal when the connection device does not include the external microphone, and for selecting, upon connecting the call while a plurality of connection devices are connected to the portable electronic device, one connection device from among the plurality of connection devices to output a second signal.

According to another aspect of the present invention, a portable electronic device is provided. The portable electronic device includes a controller; a communication connector electrically coupled to the controller, wherein the communication connector is configured to connect to a wireless connection device; a communication unit electrically coupled to the controller, wherein the communication unit is configured to receive a first signal; a COder-DECoder (CODEC) electrically coupled to the controller; a built-in speaker electrically coupled to the CODEC; a built-in microphone electrically coupled to the CODEC to receive a second signal; and a connector electrically coupled to at least one of the controller and the CODEC, wherein the connector is configured to connect to a connection device, wherein, upon connecting a call, the controller is configured to operate the built-in microphone when the connection device does not include an external microphone, and wherein, upon connecting the call while the wireless connection device and the connection device are both connected to the portable electronic device, the controller is configured to selectively provide the first signal to one of the wireless connection device and the connection device.

According to another aspect of the present invention, a portable electronic device is provided. The portable electronic device includes a connection device checker configured to check whether a connection device connected to a connector of the portable electronic device includes an external microphone, wherein the connector is electrically coupled to the connection device checker; a controller electrically coupled to the connection device checker, the controller being configured to operate a built-in microphone of the portable electronic device to receive a first signal upon connecting a call, when the connection device does not include the external microphone, and output a second signal via a speaker of one of a plurality of connection devices connected to the portable terminal upon connecting the call.

According to another aspect of the present invention, a method of controlling a built-in microphone of a portable electronic device is provided. The method includes checking whether a connection device connected to the portable electronic device includes an external microphone; operating the built-in microphone of the portable electronic device to receive a first signal, upon connecting a call, when the connection device does not include the external microphone; and selecting, upon connecting the call while a plurality of connection devices are connected to the portable electronic device, one connection device from among the plurality of connection devices to output a second signal.

According to another aspect of the present invention, a method of controlling a built-in microphone of a portable electronic device including a connecter configured to connect to a connection device, and further including a communication connector configured to connect to a wireless connection device is provided. The method includes operating, upon connecting a call, the built-in microphone of the portable electronic device, when the connection device is connected to the connector and does not include an external microphone; and selectively providing, upon connecting the call while the wireless connection device and the connection device are both connected to the portable electronic device, a signal to one of the wireless connection device and the connection device.

According to another aspect of the present invention, a method of controlling a built-in microphone of a portable electronic device is provided. The method includes checking whether a connection device connected to the portable electronic device includes an external microphone; operating the built-in microphone of the portable electronic device to receive a first signal, upon connecting a call, when the connection device does not include the external microphone; and outputting a second signal via a speaker of one of a plurality of connection devices connected to the portable terminal upon connecting the call.

According to another aspect of the present invention, a portable electronic device is provided. The portable electronic device includes a controller being configured to operate one connection device from among a plurality of connection devices to output a signal, upon connecting a call while the plurality of connection devices are connected to the portable electronic device, each of the plurality of connection devices having a speaker; and a plurality of connectors, each configured to electrically couple the controller and a respective one of the plurality of connection deices.

A method in a portable electronic device is provided. The method includes connecting a wireless call with another electronic device; and upon connecting the wireless call while a plurality of connection devices are connected to the portable electronic device, operating one connection device from among the plurality of connection devices to output a signal, each of the plurality of connection devices having a speaker.

According to another aspect of the present invention, a portable electronic device is provided. The portable electronic device includes a controller; a communication connector electrically coupled to the controller, wherein the communication connector is configured to connect to a wireless connection device; a COder-DECoder (CODEC) electrically coupled to the controller; a built-in speaker electrically coupled to the CODEC; a built-in microphone electrically coupled to the CODEC; and a connector electrically coupled to at least one of the controller and the CODEC, wherein the connector is configured to connect to a connection device, wherein, upon connecting a call, the controller is configured to operate the built-in microphone when the connection device does not include an external microphone, and wherein, upon connecting the call while the wireless connection device and the connection device are both connected to the portable electronic device, the controller is configured to select one of the wireless connection device and the connection device to output a signal.

According to another aspect of the present invention, a portable electronic device is provided. The portable electronic device includes a built-in microphone; a built-in speaker; a connector; a connection device checker configured to check whether a connection device connected to the connector includes an external microphone, wherein the connector is electrically coupled to the connection device checker; and a controller electrically coupled to the connection device checker, the controller being configured to operate the built-in microphone to receive a first signal, upon connecting a call when the connection device does not include the external microphone, and being further configured to output a second signal, which is a voice signal, via a first external speaker of a wired connection device or a second external speaker of a wireless device, upon connecting the call while both the wired connection device and the wireless connection device are connected to the portable electronic device.

According to another aspect of the present invention, a portable electronic device is provided. The portable electronic device includes a built-in microphone; a plurality of connectors, each of the plurality of connectors being configured to couple a respective connection device to the portable electronic device; a connection device checker configured to check whether a connection device coupled to a connector includes an external microphone, wherein the plurality of connectors are coupled to the connection device checker; and a controller electrically coupled to the connection device checker, the controller being configured to receive a voice signal via a first external microphone of a wired connection device or a second external microphone of a wireless connection device, upon connecting a call while both the wired connection device and the wireless connection device are connected to the portable electronic device.

BRIEF DESCRIPTION OF THE DRAWINGS

The above and other aspects, features and advantages of certain embodiments of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described below with reference to the accompanying drawings. In the following description, well-known functions or constructions are not described in detail since they would obscure the invention in unnecessary detail.

The present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone. The present invention will hereinafter be described with reference to FIG. 1.

In the present invention, an earphone is defined as a device that does not include a microphone and includes a speaker for outputting an output audio signal. A wireless earphone is defined as a device that does not include a microphone and includes a speaker for outputting an output audio signal by being wirelessly connected through a wireless connection method such as Bluetooth®. A headset is defined as a device that includes both a microphone and a speaker. A wireless headset is defined as a device that includes both a microphone and a speaker, each of which transmits/receives an audio signal by being wireless connecting through a wireless connection method such as the Bluetooth. The headset or the wireless headset is also referred to as an ear microphone.

Figure 1:
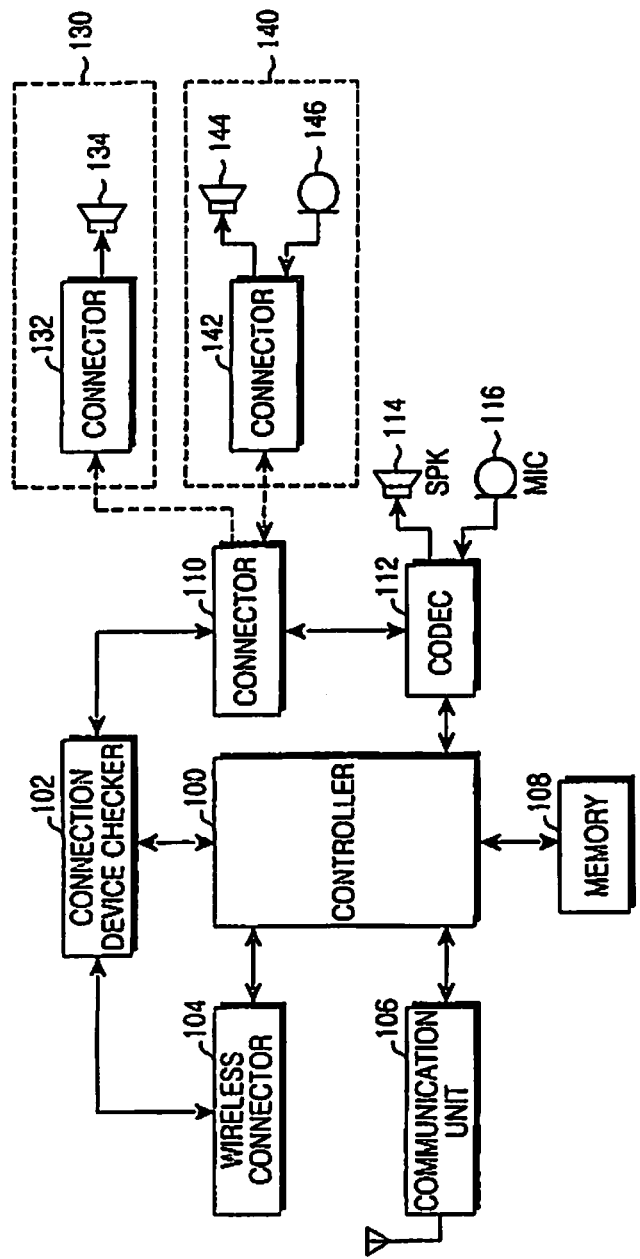
FIG. 1 is a block diagram illustrating a structure of a portable terminal for detecting whether to use a built-in microphone depending on which connection device is used when a call connection event occurs, according to an embodiment of the present invention.

Referring to FIG. 1, the portable terminal of the present invention includes a controller 100, a connection device checker 102, a wireless connector 104, a communication unit 106, a memory 108, a connector 110, a COder-DECoder (CODEC) 112, a built-in speaker 114, and a built-in microphone 116.

The wireless connector 104 wirelessly transmits/receives an audio signal by connecting a wireless device (e.g., wireless earphone or wireless headset) under the control of the controller 100, and provides information on the connected wireless device to the connection device checker 102 at the request of the connection device checker 102. The wireless connector 104 may use a Bluetooth communication technique for wireless connection. When the wireless connector 104 uses the Bluetooth communication technique, a general operation of Bluetooth communication is performed in which a connectable Bluetooth device is searched for under the control of the controller 100 and Bluetooth connection is made by pairing if authentication is required. In the present invention, the wireless connector 104 is optional, and thus may not be provided.

In a receiving operation, the communication unit 106 decreases a frequency of a Radio Frequency (RF) signal received through an antenna, and then performs de-spreading and channel decoding on the received signal. In a transmitting operation, the communication unit 106 performs channel coding and spreading on the received signal, increases the frequency of the received signal, and then transmits the signal through the antenna. In addition, in order to connect a call, the communication unit 106 receives or transmits a call connection request.

The memory 108 stores programs for controlling an overall operation of the portable terminal, application programs, and data (e.g., telephone numbers, Short Message Service (SMS) messages, compressed image files, video, etc.).

Through a wired connection, the connector 110 may be physically connected to a connector 132 of an earphone 130 including only a speaker 134 or may be physically connected to a connector 142 of a headset 140 including both a speaker 144 and a microphone 146. The connector 110 may be composed of one socket that can connect both the earphone 130 and the headset 140. Alternatively, the connector 110 may be composed of a first socket for connecting the earphone 130 and a second socket for connecting the headset 140 so as to be respectively connected to a plurality of devices.

The CODEC 112 connected to the controller 100, the built-in speaker 114 connected to the CODEC 112, and the built-in microphone 116 are provided as an audio input/output block used for a voice call. The CODEC 112 converts Pulse Code Modulation (PCM) data provided from the controller 100 into an analog audio signal and then transmits the analog audio signal to the built-in speaker 114, or transmits the analog audio signal through the earphone 130 and the speaker 144 of the headset 140. In addition, the CODEC 112 converts an input audio signal received through the built-in microphone 116 or through the microphone 146 of the headset 140 into data, and then transmits the data to the controller 100.

At the request of the controller 100, the connection device checker 102 checks the wireless connector 104 so as to determine whether a wireless earphone or a wireless headset is connected. In addition, the connection device checker 102 checks the connector 110 so as to determine whether an earphone or a headset is connected. Then, the connection device checker 102 provides the controller 100 with information on the connected device.

Upon detecting a call connection event when a call connection request is received or transmitted, the controller 100 requests the connection device checker 102 to send information on a connection device currently connected, and receives information on the connection device from the connection device checker 102 and thus selects a device for inputting/outputting an audio signal according to the connection device.

In other words, under the control of the controller 100, upon detecting the call connection event, information on the connection device currently connected is checked through the connection device checker 102, and if the connection device is either an earphone or a wireless earphone, an output audio signal is output to the connected earphone or the wireless earphone, and the input audio signal is received by activating the built-in microphone 116 of the portable terminal. If the information on the connection device is a headset (or wireless headset), audio signal is input/output by activating a speaker and a microphone of the headset (or wireless headset). If no connection device is connected, the audio signal is input/output by activating the built-in speaker 114 and the built-in microphone 116 of the portable terminal. In addition, under the control of the controller 100, when the call connection event occurs, if the connection device information obtained by the connection device checker 102 shows that two or more connection devices are connected, the connection devices for providing services are selected according to a predetermined priority. For example, if the connector 110 has a plurality of connection sockets and detects the call connection event in a state that both an earphone and a headset are connected, then the audio signal is input/output by activating the speaker and microphone of the headset under the control of the controller 100.

Meanwhile, the controller 100 controls the connection device checker 102. That is, the controller 100 may perform a function of the connection device checker 102. The controller 100 and the connection device checker 102 are described as being separately implemented in the present invention, this is for explanation purposes only. Thus, in practice, the connection device checker 102 may be incorporated into the controller 100 or may be provided separately from the controller 100.

Figure 2:
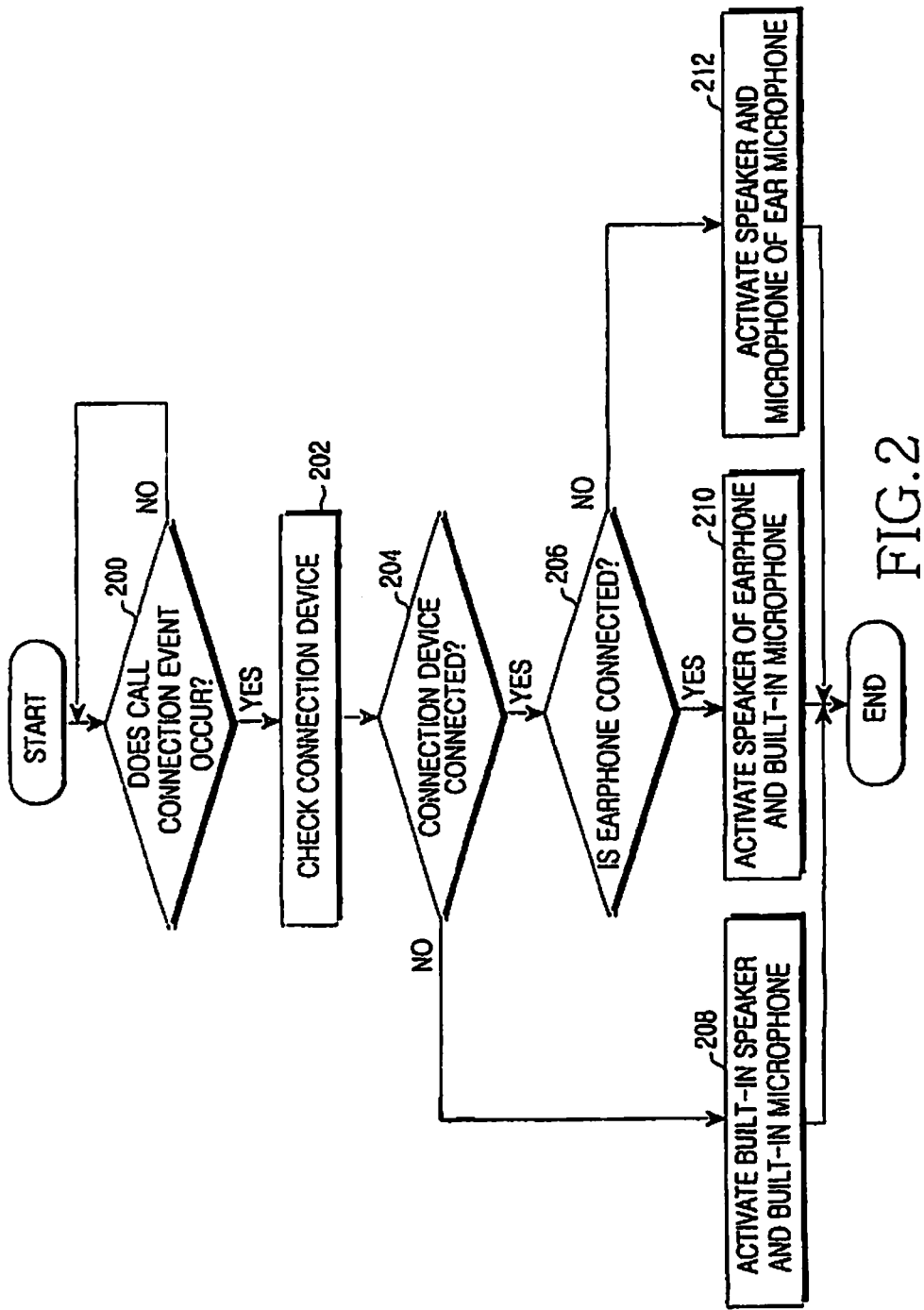
FIG. 2 is a flowchart illustrating a process of determining whether to use a built-in microphone depending on which connection device is used when a call connection event occurs in a portable terminal, according to an embodiment of the present invention.

Now, a method of controlling a microphone of a portable terminal according to the present invention will be described with reference to FIG. 2. FIG. 2 is a flowchart illustrating a process of determining whether to use a built-in microphone depending on which connection device is used when a call connection event occurs in a portable terminal, according to an embodiment of the present invention.

Referring to FIG. 2, upon detecting a call connection event in step 200, information on a connected connection device is checked in step 202.

In step 204, existence of the connection device is determined according to the checking result of step 202. If the determination result of step 204 shows that no connection device is connected, a built-in speaker and a built-in earphone are activated in step 208, so as to input/output an audio signal.

If the determination result of step 204 shows that a connection device is connected, it is determined whether the connected connection device is an earphone in step 206. If the determination result of step 206 shows that the connected connection device is the earphone, a speaker of the earphone and a built-in microphone of the portable terminal are activated in step 210, so that the output audio signal is output through the speaker of the earphone and the input audio signal is received through the built-in microphone.

If the determination result of step 206 shows that the connected connection device is not the earphone but a headset, the speaker and microphone of the headset are activated so that the audio signal is input/output through the ear microphone.

Although it has been described in FIG. 2 that the earphone and the headset are connected, the earphone described in FIG. 2 may be a wireless earphone, and the headset may be a wireless headset.

According to the present invention, an apparatus and method is provided in which a microphone of a portable terminal is controlled such that, when a call connection event occurs for call reception/origination in the portable terminal connected with an earphone without a microphone, an output audio signal is output to the connected earphone and an input audio signal is received through a built-in microphone of the portable terminal. Therefore, a call can be made without having to disconnect the earphone from the portable terminal, thereby providing convenience to users.

While the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An electronic device comprising:
    a built-in microphone;
    a wireless communication connector to connect with a wireless device including a speaker and a microphone;
    a socket to couple with one of a first device including a speaker, but not including a microphone, and a second device including both a speaker and a microphone; and
    a controller configured, in response to a call connection event, to:
        based on a determination that the electronic device is coupled with the first device, obtain an audio input via the built-in microphone;
        based on a determination that the electronic device is coupled with the second device, obtain an audio input via the microphone of the second device; and
        selectively obtain, based on a determination that the electronic device is simultaneously coupled with the wireless device and the second device, one of an audio input via the microphone of the wireless device and the audio input via the microphone of the second device,
    wherein the controller is further configured, in response to a call connection event, to provide an incoming voice signal received via the call connection event to a selected one of the wireless device and the first device, based on a determination that the electronic device is coupled with the wireless device and the first device.

2. The electronic device of claim 1, wherein one of the microphone of the wireless device and the microphone of the second device is selected based at least in part on a predetermined priority.

3. The electronic device of claim 1, wherein the wireless communication connector comprises a Bluetooth communication unit.

4. The electronic device of claim 1, wherein the call connection event includes accepting a call, and
    wherein, upon accepting the call while the wireless device and the second device are coupled to the electronic device, the controller is further configured to select one of the wireless device and the second device, and provide an incoming voice signal received after accepting the call to the selected one of the wireless device and the second device.

5. The electronic device of claim 1, wherein the call connection event includes accepting a call.

6. The electronic device of claim 1, wherein based on a determination that the selected one of the wireless device and the first device is the first device, the controller is further configured to obtain an audio input via the built-in microphone.

7. The electronic device of claim 6, wherein the selection of one of the wireless device and the first device is performed according to a predetermined priority.

8. The electronic device of claim 7, wherein the call connection event includes accepting a call.

9. A portable electronic device, comprising:
    a controller;
    a memory electrically coupled to the controller;
    a Bluetooth communication connector electrically coupled to the controller, wherein the Bluetooth communication connector is configured to connect to a wireless device including a speaker;
    a communication unit electrically coupled to the controller, wherein the communication unit is configured to receive a call connection request;
    a codec electrically coupled to the controller;
    a built-in speaker electrically coupled to the codec;
    a built-in microphone electrically coupled to the codec; and
    a socket electrically coupled to the controller and/or the codec, wherein the socket is shaped to receive a connector of either a first device including a speaker, but not including a microphone, and a second device including both a speaker and a microphone;

wherein, after receiving the call connection request, the controller is configured to deactivate the built-in speaker when the socket has received either the first device or the second device, wherein, after receiving the call connection request, the controller is further configured to activate the built-in microphone when the socket has received the first device, and is further configured to deactivate the built-in microphone when the socket has received the second device, wherein the controller is further configured to selectively provide an audio signal to one of the wireless device and the second device when wireless device and the second device are simultaneously in connection with the portable electronic device, and wherein after receiving a call connection request, the controller is further configured to provide an incoming voice signal received via the call connection request to a selected one of the wireless device and the first device, based on a determination that the wireless device and the first device are in connection with the portable electronic device.

10. The portable electronic device of claim 9, wherein the controller is further configured to selectively provide the audio signal to one of the wireless device and the second device according to a predetermined priority.

11. The portable electronic device of claim 9, wherein the controller is further configured to selectively provide an audio signal to one of the wireless device, the first device, and the second device when at least two of the wireless device, the first device, and the second device are simultaneously in connection with the portable electronic device.

12. The portable electronic device of claim 9, wherein the first device comprises an earphone and the second device comprises a headset.

13. The portable electronic device of claim 9, wherein the call connection request includes accepting a call, and wherein, upon accepting the call while the wireless device and the second device are coupled to the electronic device, the controller is further configured to select one of the wireless device and the second device, and provide an incoming voice signal received after accepting the call to the selected one of the wireless device and the second device.

14. The portable electronic device of claim 9, wherein the call connection request includes accepting a call.

15. The portable electronic device of claim 9, wherein based on a determination that the selected one of the wireless device and the first device is the first device, the controller is further configured to activate the built-in microphone.

16. The portable electronic device of claim 15, wherein the selection of one of the wireless device and the first device is performed according to a predetermined priority.

17. The portable electronic device of claim 16, wherein the call connection request includes accepting a call.

18. An electronic device capable of coupling to a wireless external device and a wired external device, the electronic device comprising:
a built-in speaker;
a built-in microphone;
a wireless communication unit configured to wirelessly connect with the wireless external device including a speaker and a microphone;
a socket configured to couple with the wired external device being one of a first device including a speaker, but not including a microphone, and a second device including both a speaker and a microphone; and
a controller configured, in response to a call connection event, to:
if the first device is coupled with the socket, obtain an audio input via the built-in microphone;
if the second device is coupled with the socket, obtain an audio input via the microphone of the second device; and
selectively obtain, if the electronic device is coupled with both the wireless external device and the second device, an audio input from one of the microphone of the wireless external device and the microphone of the second device,
wherein the controller is further configured, in response to a call connection event, to select one of the wireless external device and the first device and provide an incoming voice signal received via the call connection event to the selected one of the wireless external device and the first device, if the electronic device is coupled with both the wireless external device and the first device.

19. The electronic device of claim 18, wherein one of the microphone of the wireless external device and the microphone of the second device is selected based at least in part on a predetermined priority.

20. The electronic device of claim 18, wherein the wireless communication unit comprises a Bluetooth communication unit.

21. The electronic device of claim 18, wherein the call connection event includes accepting a call.

22. The electronic device of claim 18, wherein if the selected one of the wireless external device and the first device is the first device, the controller is further configured to obtain an audio input via the built-in microphone.

23. The electronic device of claim 22, wherein the selection of one of the wireless external device and the first device is performed according to a predetermined priority.

24. The electronic device of claim 23, wherein the call connection event includes accepting a call.

25. A portable electronic device, comprising:
a controller;
a memory electrically coupled to the controller;
a Bluetooth communication unit electrically coupled to the controller, wherein the Bluetooth communication unit is configured to wirelessly connect to a wireless device including a speaker;
a communication unit electrically coupled to the controller;
a COder-DECoder (CODEC) electrically coupled to the controller;
a built-in speaker electrically coupled to the CODEC;
a built-in microphone electrically coupled to the CODEC; and
a socket configured to receive a connector of either an first device including a speaker, but not including a microphone, and a second device including both a speaker and a microphone;
wherein, after receiving a call connection request, the controller is configured to maintain deactivation of the built-in speaker if the socket has received either the first device or the second device,
wherein, after receiving the call connection request, the controller is further configured to activate the built-in microphone if the socket has received the first device, and is further configured to maintain deactivation of the built-in microphone if the socket has received the second device, and wherein, after receiving a call connection request, the controller is further configured to selectively provide an audio signal to one of the wireless device and the second device if the wireless device and the second device are both in connection with the portable electronic device, and wherein after receiving a call connection request, the controller is further configured to select one of the wireless device and the first device and provide an incoming voice signal received via the call connection request to the selected one of the wireless device and the first device, if the wireless device and the first device are both in connection with the portable electronic device.

26. The portable electronic device of claim 25, wherein the controller is further configured to selectively provide the audio signal to one of the wireless device and the second device according to a predetermined priority.

27. The portable electronic device of claim 25, wherein after receiving a call connection request, the controller is further configured to selectively provide an audio signal to one of the wireless device, the first device, and the second device if at least two of the wireless device, the first device, and the second device are in connection with the portable electronic device.

28. The portable electronic device of claim 27, wherein the controller is further configured to selectively provide the audio signal to one of the wireless device, the first device, and the second device according to a predetermined priority.

29. The portable electronic device of claim 27, wherein the call connection request includes accepting a call.

30. The portable electronic device of claim 25, wherein the first device comprises an earphone and the second device comprises a headset.

31. The portable electronic device of claim 25, wherein the call connection request includes accepting a call.

32. The portable electronic device of claim 25, wherein if the selected one of the wireless device and the first device is the first device, the controller is further configured to activate the built-in microphone.

33. The portable electronic device of claim 32, wherein the selection of one of the wireless device and the first device is performed according to a predetermined priority.

34. The portable electronic device of claim 33, wherein the call connection request includes accepting a call.

35. A portable electronic device, comprising:
a controller;
a memory electrically coupled to the controller;
a Bluetooth communication connector electrically coupled to the controller, wherein the Bluetooth communication connector is configured to connect to a wireless device including a speaker;
a communication unit electrically coupled to the controller, wherein the communication unit is configured to receive a call connection request;
a CODEC electrically coupled to the controller;
a built-in speaker electrically coupled to the CODEC;
a built-in microphone electrically coupled to the CODEC; and
a socket electrically coupled to the controller and/or the CODEC, wherein the socket is shaped to receive a connector of either (1) an earphone including a speaker, but not a microphone, or (2) a headset including both a speaker and a microphone,
wherein, after receiving the call connection request, the controller is configured to not activate the built-in speaker when the socket has received either the earphone or the headset,
wherein, after receiving the call connection request, the controller is further configured to activate the built-in microphone when the socket has received the earphone, but is configured to not activate the built-in microphone when the socket has received the headset,
wherein the controller is further configured to selectively provide an audio signal to one of the wireless device, the earphone, or the headset when two or more of the wireless device, the earphone or the headset are simultaneously in connection with the electronic device, and
wherein after receiving a call connection request, the controller is further configured to provide an incoming voice signal received via the call connection request to a selected one of the wireless device and the earphone, based on a determination that the wireless device and the earphone are in connection with the portable electronic device.

* * * * *